United States Patent
Nozaki et al.

(10) Patent No.: US 6,784,279 B2
(45) Date of Patent: Aug. 31, 2004

(54) AROMATIC POLYAMIDE COMPOSITIONS FOR MOLDING

(75) Inventors: Masahiro Nozaki, Utsunomiya (JP); Reiko Koshida, Utsunomiya (JP); Takeo Tasaka, Tokushima-ken (JP); Tadao Ushida, Kanagawa-ken (JP)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/185,485

(22) Filed: Jun. 27, 2002

(65) Prior Publication Data

US 2003/0036625 A1 Feb. 20, 2003

Related U.S. Application Data

(63) Continuation of application No. 09/630,827, filed on Aug. 2, 2000, now abandoned.

(30) Foreign Application Priority Data

Aug. 2, 1999 (JP) ............................................ 11-219331

(51) Int. Cl.[7] .......................... C08L 77/06; C08G 69/26
(52) U.S. Cl. ...................... 528/310; 528/322; 528/170; 524/413; 524/425; 524/447; 524/449; 524/451; 524/494; 524/496; 524/600; 524/606
(58) Field of Search ................................. 524/600, 606, 524/607, 546, 910; 528/170, 335, 310, 336, 312, 313, 337, 331, 338, 339

(56) References Cited

U.S. PATENT DOCUMENTS

| | | | | |
|---|---|---|---|---|
| 5,081,222 A | * | 1/1992 | Reimann et al. | 528/324 |
| 5,232,973 A | * | 8/1993 | Sakashita et al. | 524/492 |
| 5,371,132 A | * | 12/1994 | Ebara et al. | 524/413 |
| 5,504,146 A | * | 4/1996 | Goetz et al. | 524/607 |
| 5,763,561 A | * | 6/1998 | Keske | 528/310 |
| 5,849,826 A | * | 12/1998 | Ogo et al. | 524/410 |
| 5,962,628 A | * | 10/1999 | Keske | 528/310 |
| 6,476,105 B2 | * | 11/2002 | Jeong et al. | 524/99 |

* cited by examiner

Primary Examiner—P. Hampton Hightower

(57) ABSTRACT

The instant invention provides an aromatic polyamide composition for molding which is of superior rigidity, strength, toughness, dimensional stability, resistance to chemicals, external surface appearance and sliding characteristics in high-humidity, high-temperature environments, which has a low coefficient of linear expansion and which is of low warpage.

In a representative composition, 5 to 170 parts by weight of wollastonite of a number average length of approximately 5 $\mu$m to approximately 180 $\mu$m and a number average diameter of approximately 0.1 $\mu$m to 15.00 $\mu$m and the average aspect ratio of which is greater than 3:1 is compounded with 100 parts by weight of semi-aromatic polyamide in which the quantity of aromatic monomer in the monomer component that forms the polyamide is greater than 20 mol % and the melting point of which is greater than 280° C.

6 Claims, No Drawings

AROMATIC POLYAMIDE COMPOSITIONS FOR MOLDING

This application is a continuation of U.S. Ser. No. 09/630,827, filed Aug. 2, 2000, now abandoned.

FIELD OF THE INVENTION

This invention relates to a polyamide composition for molding that contains fibrous wollastonite, and, in greater detail, it relates to a polyamide composition for molding that has superior rigidity, strength, toughness, dimensional stability, resistance to chemicals, external surface appearance and sliding characteristics in high-humidity, high-temperature environments, which has a low coefficient of linear expansion and which is of low warpage in spite of the fact that there is one type of fibrous filling material. Furthermore, it relates to a polyamide composition of which excellent properties are maintained in recycled objects produced using spur or runner emerged from injecting the polyamide composition, but which make its color control easier.

BACKGROUND OF THE INVENTION

It is well known that reinforcing materials and/or filling materials are compounded with thermoplastic polymers for molding in accordance with the properties that are required by the uses of molded products.

In general, when inorganic filling materials of which glass fibers, carbon fibers, silica, clay, talc and mica are representative are used singly or in combination, improvement can be obtained in some of the required properties of molded materials such as rigidity, toughness, surface external appearance, strength, low warpage, dimensional stability and sliding characteristics and in the coefficient of linear expansion of the resin composition. On the other hand, there is a tendency for deleterious effects to be exerted on other properties. Of course, this tendency becomes marked as the content of inorganic filling material in the resin composition for molding that is finally obtained is increased. At the same time, there is also the problem that the cost of the resin composition is increased. On the other hand, in recent years, semi-aromatic polyamides that contain aromatic monomer components in a portion of their structural elements have come to be widely used because of their superior high temperature rigidity, heat resistance, resistance to chemicals and water-absorbing capacity. Attempts have also been made to apply these same polyamides and aliphatic polyamides of which nylon 6 and 66 are representative to various types of molded products as thermoplastic polymers for molding of superior mechanical strength, rigidity and heat resistance. In addition, compositions in which inorganic filling materials are compounded for the purpose of further improving rigidity and toughness are well known.

However, attempts to improve toughness and impact resistance without impairing the superior properties of the semi-aromatic polyamides by compounding inorganic filling materials with semi-aromatic polyamides have not been made to any great extent.

Under these circumstances, as an example of compounding various inorganic filling materials with semi-aromatic polyamides, there is the composition described, for example, in Japanese Patent Application Early Disclosure No. 3-210359 [1991]. A study was made of improving heat resistance due to increase of crystallinity and improving surface external appearance by compounding wollastonite or other various fillers having acicular particles which is present in natural metamorphic rock comprised essentially of calcium metasilicate with the semi-aromatic polyamide compositions as disclosed in that application. Molded objects may be colored for various uses, and polyamide composition having less effects of containing such colorant on mechanical properties and toughness is desired as injection molding compositions and spur and runner emerged from injection molding for production of molded objects are desired to be recycled to respond a social need for contribution to reduction of industrial waste in the recent years.

However, nothing has been disclosed concerning the length, diameter and aspect ratio of the wollastonite and aromatic polyamide compositions of superior rigidity, strength, toughness, dimensional stability, resistance to chemicals, external surface appearance sliding characteristics and warping characteristics in high-humidity, high-temperature environments and having low coefficients of linear expansion have not been provided.

It is an object of this invention is to provide a polyamide composition for molding of superior rigidity, strength, toughness, dimensional stability, resistance to chemicals, external surface appearance and sliding characteristics in high-humidity, high-temperature environments, of which the resin composition has a low coefficient of linear expansion and which is of low warpage in spite of the fact that there is one type of fibrous filling material.

Another object of this invention is to provide a polyamide composition of which excellent properties are maintained in recycled objects produced using spur or runner emerged from injecting the polyamide composition and molded objects even if they are colored by injecting colored molding composition. We have found that the abovementioned objects are achieved by a polyamide composition containing wollastonite having a specified diameter, length and aspect ratio. The molding polyamide composition according to the present invention shows superior rigidity, strength, toughness, dimensional stability, resistance to chemicals, external surface appearance and sliding characteristics in high-humidity, high-temperature environments, having a low coefficient of linear expansion and of low warpage. Furthermore, the molding polyamide composition according to the present invention provides advantages that excellent properties of molding polyamide composition according to the invention are maintained in recycled objects produced using spur or runner emerged from injecting the polyamide composition and molded objects even if they are colored by colorant being contained in the molding polyamide composition.

SUMMARY OF THE INVENTION

An aromatic polyamide composition for molding comprising A. 100 parts by weight of a semi-aromatic polyamide having an aromatic monomer component of greater than 20 mol % and said polyamide having at melting point greater than 280° C. and B. 5 to 170 parts by weight of wollastonite of a number average length of approximately 5 $\mu$m to approximately 180 $\mu$m and a number average diameter of approximately 0.1 $\mu$m to 15.00 $\mu$m and the average aspect ratio of which is greater than 3:1.

Another form of this invention is directed to polyamide composition comprising A. 100 parts by weight of a semi-aromatic polyamide in which (a) the quantity of aromatic monomer in the monomer component that forms the polyamide is greater than 20 mol %, and polyamide having (b) a dicarboxylic acid component from the group consisting of terephthalic acid, a mixture of terephthalic acid and isophthalic acid in which the quantity of terephthalic acid in the dicarboxylic acid component is greater than 40 mol %, a mixture of terephthalic acid and adipic acid and a mixture of terephthalic acid, isophthalic acid and adipic acid in which the quantity of terephthalic acid in the dicarboxylic acid component is greater than 40 mol % and, (c) a diamine component selected from the group consisting of hexamethylenediamine and a mixture of hexamethylenediamine and 2-methylpentamethylenediamine and with (d) the melting point greater than 280° C.; and B. 5 to 170 parts by weight of wollastonite of a number average length of approximately 5 μm to approximately 180 μm and a number average diameter of approximately 0.1 μm to 15.00 μm and the average aspect ratio of which is greater than 3:1.

DETAILED DESCRIPTION OF THE INVENTION

A. Semi-aromatic Polyamides

In the semi-aromatic polyamides that are used in this invention, the quantity of aromatic monomers in the monomers that constitute the polyamide is 20 mol % or greater and the melting point of which is greater than 280° C. The content of aromatic monomer is preferably be greater than 25 mol %, and, and preferably, from 25 mol % to 60 mol %. When the content of aromatic monomer is less than 20 mol %, high temperature rigidity and mechanical properties at times of water absorption are decreased. This is not desirable.

Specific examples of aromatic monomers include aromatic diamines, aromatic carboxylic acids and aromatic aminocarboxylic acids. Aromatic diamines can include, for example, p-phenylenediamine, o-phenylenediamine, m-phenylenediamine, p-xylene-diamine and m-xylenediamine. Aromatic dicarboxylic acids can include, for example, terephthalic acid, isophthalic acid, phthalic acid. 2-methylterephthalic acid and naphthalenedicarboxylic acid. Aromatic aminocarboxylic acids can include, for example, p-aminobenzoic acid. These aromatic monomers can be used individually or they can be used in combinations of two or more.

Of these aromatic monomers, terephthalic acid or mixtures of terephthalic acid and isophthalic acid may preferably be used.

Other structural components of the semi-aromatic polymers are aliphatic dicarboxylic acids, aliphatic alkylenediamines, alicyclic alkylenediamines and aliphatic aminocarboxylic acids.

The aliphatic dicarboxylic acid component can be adipic acid, sebacic acid, azelaic acid and dodecanoic acid. They may be used individually or in combinations of two or more. The use of adipic acid is preferable.

The aliphatic alkylenediamine component may be straight chain or branched chain. Specifically, it can be ethylenediamine, trimethylenediamine, tetramethylenediamine, pentamethylenedimanine, hexamethylenediamine, 1,7-diaminoheptane, 1,8-diaminooctane, 1,9-diaminononane, 1,10-diaminodecane, 2-methylpentamethylenediamine and 2-ethyltetramethylenediamine. They may be used individually and in combinations of two or more.

The alicyclic alkylenediamine component can be 1,3-diaminocyclohexane, 1,4-diaminocyclohexane, 1,3-bis (aminomethyl)cyclohexane, bis(aminomethyl)cyclohexane, bis(4-aminocyclohexyl)methane, 4,4'-diamino-3,3'-dimethyldicyclohexylmethane, isophoronediamine and piperazine. They may be used individually or in combinations of two or more.

The alicyclic aminocarboxylic acid component can be 6-aminocaproic acid, 11-aminoundecanoic acid and 12-aminododecanoic acid. Cyclic lactams that correspond to these raw materials may also be used. They may be used individually or in combinations of two or more.

The semi-aromatic polyamides that are used in this invention can be prepared by polymerizing the aforementioned monomer components. They may also be prepared by mixing two or more semi-aromatic polyamides.

The specific structural components and component ratios of the semi-aromatic polyamide in which the quantity of aromatic monomers in the monomer component that constitutes the polyamide is greater than 20 mol % is determined appropriately in accordance with the properties that are required of the product that is to be molded from the polyamide composition of this invention and so that the melting point of the semi-aromatic polyamide is greater than 280° C. When the melting point is lower than 280° C., heat resistance is not sufficient which is not desirable. When it is higher than 350° C., decomposition gases of the composition are generated. Preferably, it should be 280° C. to 350° C. More preferably, it should be 295° C. to 330° C.

The dicarboxylic acid component (b) may be a mixture of terephthalic acid and isophthalic acid, or when a mixture of terephthalic acid, isophthalic acid and adipic acid is used, the quantify of terephthalic acid in the dicarboxylic acid component may be greater than 50 mol %.

B. Wollastonite

The wollastonite that is used in this invention is a white mineral that consists essentially of calcium metasilicate, which is commonly used as an inorganic filler material of thermoplastic polymers for molding.

Wollastonite is fibrous, its number average length should be in the range of 5 to 180 μm, and, preferably, of 20 to 100 μm, its number average diameter should be in the range of 0.1 to 15.0 μm, and, preferably, of 2.0 to 7.0 μm and its average aspect (length and breadth) ratio should be greater than 3:1, preferably in the range of 3:1 to 50:1, and, more preferably, of 5:1 to 30:1. When the number average length, the number average diameter and the average aspect ratio of the wollastonite are not within the specified range of this invention, an aromatic polyamide composition for molding of superior rigidity, strength, toughness, dimensional stability, resistance to chemicals surface external appearance and sliding characteristics in high-temperature, high-humidity environments, having a low coefficient of linear expansion and of low warpage cannot be realized.

Wollastonite of this kind is compounded in an amount of 5 to 170 parts by weight, and, preferably, of 10 to 100 parts by weight, per 100 parts by weight of the resin component in the composition of this invention.

When glass fibers, which are well known as fibrous inorganic filler materials, are compounded in polyamides in high content, warping of the molded product becomes a problem. However, in this invention, molded products of low warpage can be provided in spite of the fact that a fibrous filling material is used in a high content.

It is preferred that the fibrous wollastonite used in this invention be treated with a titanate, silane, zirconate coupling agent or other coupling agents or other surface treatments. It is also preferable that the wollastonite fibers are treated with silane surface treatments by using aminosilane (γ-aminopropyltriethoxysilane) or epoxysilane (γ-glycidxypropylmethoxysilane). The amount of the above-mentioned surface treatment assents is about 0.2–2.0 wt % per hundred pants by weight of the wollastonite, more preferably 0.5–1.0 wt %. In a preferred treatment process, the treatment agents are added to the wollastonite fibers followed by heating and drying or untreated wollastonite fibers are mixed with a blend of polyamide resins and the treatment agents with the predetermined amounts by integral blending in preparation of the polyamide composition according to the present invention.

The polyamide composition of this invention can also contain a thermal stabilizer. The thermal stabilizer may be a compound containing copper in which the copper content is 10 to 1000 ppm. A copper halide such as copper iodide or copper bromide is particularly desirable. An alkyl halogen compound is ordinarily added as an auxiliary thermal stabilizer.

Further, a phenolic antioxidant may also be added to the polyamide composition of this invention and an antioxidant and a thermal stabilizer may be used in combination.

The phenolic antioxidant can be triethyleneglycol.bis[3-(3-t-butyl-5-methyl-4-hydroxyphenyl)propionate], 1,6-hexanediol.bis[3-(3,5-di-t-butyl-4-hydroxyphenyl)propionate], pentaerythrityl-tetrakis[3-(3,5-di-t-butyl-4-hydroxyphenyl) propionate], octadecyl-3-(3,5-di-t-butyl-4-hydroyphenyl)propionate, octadecyl-3-(3,5-di-t-butyl-4-hydroyphenyl)propionate, 3,5-di-t-butyl-4-hydroxybenzylphosphonatodiethyl ester, N,N'-hexamethylenebis(3,5-di-t-butyl-4-hydroxyhydrocinnamide), 1,3,5-trimethyl-2,4,6-tris(3,5-di-t-butyl-4-hydroxybenzyl)benzene and 3,9-bis[2-(3-(3-t-butyl-4-hydroxy-5-methylphenyl)propionyloxy)-1,1-dimethylethyl]-2,4,8,1-tetraoxaspiro[5,5]undecane. Of these, pentaerythrityl-tetrakis[3-(3,5-di-t-butyl-4-hydroxyphenyl)propionate] and N,N'-hexamethylenebis(3,5-di-t-butyl-4-hydroxyhydrocinnamide) are preferable.

A phosphorus or sulfur auxiliary antioxidant may be added together with the phenol oxidizing agent. The phosphorus auxiliary antioxidant can be tris(2,4-di-t-butylphenyl)phosphite, 2-[[2,4,8,10-tetrakis(1,1-dimethylethyl)dibenzo[d,f][1,3,2]dioxaphosphebin6-yl]oxy]-N,N-bis[2-[[2,4,8,10-tetrakis(1,1dimethylethyl) dibenzo[d,f][1,3,2]dioxaphosphebin6-yl]oxy]-ethyl] ethanamine and bis(2,6-di-t-butyl-4-methyl-phenyl) pentaerythrtol diphosphite. Of these, 2-[[2,4,8,10-tetrakis(1,1-dimethylethyl)dibenzo[d,f][1,3,2]dioxaphosphebin6-yl]oxy]-N,N-bis[2-[[2,4,8,10-tetrakis(1,1-dimethylethyl) dibenzo[d,f][1,3,2]dioxaphosphebin6-yl]oxy]-ethyl] ethanamine is preferable.

The sulfur auxiliary antioxidant can be 2,2-thiodiethylenebis[3-(3,5-di-t-butyl-4-hydroxyphenyl)propionate] and tetrakis[methylene-3-(dodecylthio) propionato]methane.

The polyamide composition of this invention can also contain a mold releasing agent. The mold releasing agent can be a fatty acid, a fatty ester, a metal salt of a fatty acid and mixtures thereof, fatty acid ethers, polyethylene waxes and derivatives thereof and various types of monoamides, bis amides and bis urea.

The aromatic polyamide composition for molding of this invention may be added to the aforementioned components to an extent that does not impair its characteristics and commonly used additives such as weather resistance stabilizers, fire-retarding agents, plasticizers and nucleation agents can be compounded with the polyamide.

The aromatic polyamide composition for molding of this invention can be prepared by fusing and mixing the aforementioned aromatic polyamide A, the wollastonite B, and, further, as desired, necessary additives and/or other resins. There are no particular limitations on the method of preparation. For example, it can be prepared by a method such as compounding and kneading additives and/or other resins as desired while the aforementioned aromatic polyamide A and wollastonite B are being fused using a kneading device such as a biaxial screw extruding machine.

A molded product of the desired shape can be manufactured from the aromatic polyamide composition for molding of this invention using commonly used fusion molding methods, for example, extrusion molding, compression molding or extrusion molding.

EXAMPLES

The invention is better understood by having reference to the following examples.

We shall now describe this invention by presenting example. However, this invention is not limited solely to these examples.

Examples 1 to 3 and Comparative Examples 1 to 5

The aromatic polyamide and the inorganic filling materials shown in Table 1 were fused and kneaded in a biaxial screw extruding machine and cooled with water, after which pellets were manufactured. Test strips for the test method were molded at a mold temperature of 150° C. using the pellets that were obtained. Tensile strength, tensile breaking elongation, bending strength, flexural modulus, notch Izod impact strength and the coefficient of linear expansion were determined using the test strips that were molded. Test strips of 75 mm×125 mm×3.2 mm were molded at a mold temperature 150° C. using the pellets that were obtained and the molding shrinkage rate was determined using the test strips. The results are shown in Table 1.

The semi-aromatic nylon and inorganic filler materials that were used in the examples and comparative examples were as follows.

Inorganic Filler Materials

A. Fibrous wollastonite (brand name: Bistal W101; manufactured by Otsuka Chemicals (Ltd.)
Number average length: 20–35 μm; number average diameter: 2–5 μm, average aspect ratio: 4:1–14:1

B. Fibrous wollastonite (brand name: Nyad G; manufactured by the Nyco Company)
Average length/average diameter: shows a broad range distribution that exceeds
the range specified in this invention.
Average aspect ratio: 15:1

C: Spheroidal sintered clay (brand name: Translink445; manufactured by the Engelhard Company)
Average diameter: 1.4 μm D: Glass fibers (brand name: PPG3540; manufactured by the PPG Company)
Average fiber length: 3 mm, average fiber diameter: 10 μm
Aspect ratio: 300:1

Aromatic Polyamide
Semi-aromatic polyamide in which 2-methjylpentamethylenediamine, hexamethylenediamine and terephthalic acid are polymerized in proportions of 25 mol %, 25 mol % and 50 mol %, respectively (brand name: HTN501; manufactured by the Du Pont Company, melting point, 305° C.; glass transition temperature, 125° C.)

The determination methods were as follows.
(Tensile strength)
Determined in accordance with ASTM D638.
(Tensile breaking elongation)
Determined in accordance with ASTM D638.
(Bending strength)
Determined in accordance with ASTM D790.
(Flexural modulus)
Determined in accordance with ASTM D790-92.
(Notch Izod impact strength)
Determined in accordance with ASTM D256.
Coefficient of Linear Expansion The coefficients of linear expansion in a temperature range from −40° C. to 180° C. were determined using ASTM bending test strips.
Molding Shrinkage Rate The test strips obtained as described above were allowed to stand for 48 hours at 23° C. and a relative humidity of 50%, after which determinations were made during molding of the shrinkage rate F in the direction of resin flow and the shrinkage rate V in direction perpendicular to the resin flow. The closer the vale of G/V approaches 1, the less warping of the molded product there is.
Coefficient of Kinetic Friction/abrasion Loss Coefficient of kinetic friction of the test bars for tensile test according to ASTM were measured in by actual distance after 1 hour of reciprocating sliding test under the following conditions:

Load: 2 kgf

Distance: 32.5 mm

Time cycle: 1 sec

Subject material: SMC45

Abrasion and coefficient of kinetic friction were measured after 24 hours of revolution sliding test with a revolution type friction and abrasion tester under the following conditions:

Load: 20 kgf

Distance: 15 m/sec coefficient of linear expansion can be obtained by using the wollastonite specified by this invention.

Comparing the results of Examples 1 and 2 with those of Comparative Example 5, it can be seen that although there were no marked differences in rigidity, there was lower warpage in the examples in which fibrous wollastonite was used.

Example 4 and Comparative Example 6

In order to confirm the effects of coloring agents on the polyamide compositions for molding of this invention, a master batch of $TiO_2$ prepared so that the $TiO_2$ content in the molded products would be 0.08 weight % were compounded respectively with the same composition as in Example 2 and Comparative Example 5, and test bars were molded as in the above Examples. The physical properties of the tests bars prepared by the composition containing TiO2 were determined and the physical properties maintenance rate (%) for the test bars obtained from the composition not containing TiO2 was found. The results are shown in Table 2.

TABLE 2

| Composition before compounding $TiO_2$ master batch | Example 4 Example 2 | Comparative Example 6 Comparative Example 5 |
|---|---|---|
| Aromatic polyamide Content (wt %) | 60 | 65 |
| Filler material | | |
| Type | Wollastonite A | Glass fibers |
| Content (wt %) | 40 | 35 |
| $TiO_2$ content in molded product | 0.08 | 0.08 |
| Tensile strength maintenance rate (%) | 99 | 91 |
| Elongation maintenance rate (%) | 93 | 88 |
| Bending strength maintenance rate (%) | 96 | 89 |
| Flexural modulus maintenance rate (%) | 93 | 95 |
| Notch Izod impact strength maintenance rate (%) | 100 | 78 |

Comparing the results of Example 4 with those of Comparative Example 6, it can be seen it can be seen that all of

TABLE 1

| | Ex 1 | Ex 2 | Ex 3 | Cmp Ex 1 | Cmp Ex 2 | Cmp Ex 3 | Cmp Ex 4 | Cmp Ex 5 |
|---|---|---|---|---|---|---|---|---|
| Aromatic polyamide (wt %) | 70 | 60 | 50 | 60 | 70 | 60 | 50 | 65 |
| Inorganic filler material A (wt %) | 30 | 40 | 50 | 0 | 0 | 0 | 0 | 0 |
| Inorganic filler material B (wt %) | 0 | 0 | 0 | 40 | 0 | 0 | 0 | 0 |
| Inorganic filler material C (wt %) | 0 | 0 | 0 | 0 | 30 | 40 | 50 | 0 |
| Inorganic filler material D (wt %) | 0 | 0 | 0 | 0 | 0 | 0 | 0 | 35 |

When Examples 1 to 3 and Comparative Examples 2 to 5 are compared, it can be seen that molded products of superior rigidity, strength and toughness and be provided and that semi-aromatic polyamide compositions having low coefficients of linear expansion can be provided when fibrous wollastonite is used.

When Example 2 and Comparative Example 1 are compared, it can be seen that rigidity, strength and toughness can be further improved and that an extremely low value for the physical properties were better maintained in Example 4. From this, it is evident that the aromatic polyamide composition of this invention could maintain superior physical properties even in colored molded products.

Example 5 and Comparative Example 7

In order to confirm the effects of addition of molding composition obtained from recycling of molded articles of the polyamide composition according to this invention on properties of such recycled articles, test bars of Example 2 and Comparative Example 5 were pulverized to essentially the same size as the pellets and the pulverized material was subjected to injection molding under the same conditions as for molding the test bars, by which means the test bars were recycled. The physical properties of the recycled test bars were determined and the maintenance rates for the various physical properties for the test bars obtained from the composition before pulverization and being recycled were found. The results are shown in Table 3.

TABLE 3

|  | Example 5 | Comparative Example 7 |
|---|---|---|
| Aromatic polyamide Content (weight %) | 60 | 65 |
| Filler material |  |  |
| Type | Wollastonite A | Glass fibers |
| Content (weight %) | 40 | 35 |
| Tensile strength maintenance rate (%) | 100 | 90 |
| Elongation maintenance rate (%) | 100 | 93 |
| Bending strength maintenance rate (%) | 99 | 84 |
| Flexural modulus maintenance rate (%) | 99 | 97 |
| Notch Izod impact strength maintenance rate (%) | 100 | 84 |

Comparing these results of Example 5 with those in Comparative Example 7, it can be seen that a superior balance of various properties of the polyamide to composition is maintained in Example 5. From this, it is evident that superior properties can be maintained even in molded products that are used for recycling.

The aromatic polyamide composition for molding of this invention can provide molded products having low coefficients of linear expansion, of superior rigidity, strength, toughness, dimensional stability, resistance to chemicals, external surface appearance and sliding characteristics in high-humidity, high-temperature environments, and of low warpage.

Furthermore, the aromatic polyamide composition of this invention can provide molded articles of which excellent properties are maintained in recycled objects produced using spur or runner emerged from injecting the polyamide composition and molded objects even if they are colored.

What is claimed is:

1. An aromatic polyamide composition for molding comprising:

A. 100 parts by weight of semi-aromatic polyamide aromatic monomer component of greater than 20 mol % and said melting having a melting point of which is greater than 280° C.; and B. 5 to 170 parts by weight of wollastonite of a number average length of approximately 5 μm to approximately 180 μm and a number average diameter of approximately 0.1 μm to 15.00 μm and the average aspect ratio of which is greater than 3:1.

2. An aromatic polyamide composition for molding comprising:

A. 100 parts by weight of a semi-aromatic polyamide in which (a) the quantity of aromatic monomer in the monomer component that forms the polyamide is greater than 20 mol %, said polyamide having (b) a dicarboxylic acid component selected from the group consisting of terephthalic acid, a mixture of terephthalic acid and isophthalic acid in which the quantity of terephthalic acid in the dicarboxylic acid component is greater than 40 mol %, a mixture of terephthalic acid and adipic acid and a mixture of terephthalic acid, isophthalic acid and adipic acid in which the quantity of terephthalic acid in the dicarboxylic acid component is greater than 40 mol %, and (c) a diamine component selected from the group consisting of hexamethylenediamine and a mixture of hexamethylenediamine and 2-methylpentamethylenediamine and (d) a melting point greater than 280° C.; and B. 5 to 170 parts by weight of wollastonite of a number average length of approximately 5 μm to approximately 180 μm and a number average diameter of approximately 0.1 μm to 15.00 μm and the average aspect ratio of which is greater than 3:1.

3. The composition of claim 1 further comprising a thermal stabilizer.

4. The composition of claim 3 further comprising a phenolic antioxidant.

5. The composition of claim 4, further comprising an auxiliary antioxidant selected form the group consisting of phosphorous antioxidants and sulfur antioxidants.

6. The composition of claim 1 further comprising a mold release agent.

* * * * *